United States Patent
Hong et al.

(10) Patent No.: US 8,619,865 B2
(45) Date of Patent: Dec. 31, 2013

(54) SYSTEM AND METHOD FOR THINNING OF SCALABLE VIDEO CODING BIT-STREAMS

(75) Inventors: Danny Hong, New York, NY (US); Thomas Wiegand, Berlin (DE); Alexandros Eleftheriadis, New York, NY (US); Ofer Shapiro, Fair Lawn, NJ (US)

(73) Assignee: VIDYO, Inc., Hackensack, NJ (US)

( * ) Notice: Subject to any disclaimer, the term of this patent is extended or adjusted under 35 U.S.C. 154(b) by 1770 days.

(21) Appl. No.: 11/676,215

(22) Filed: Feb. 16, 2007

(65) Prior Publication Data
US 2007/0263087 A1    Nov. 15, 2007

Related U.S. Application Data

(60) Provisional application No. 60/774,094, filed on Feb. 16, 2006, provisional application No. 60/786,997, filed on Mar. 29, 2006, provisional application No. 60/827,469, filed on Sep. 29, 2006, provisional application No. 60/778,760, filed on Mar. 3, 2006, provisional application No. 60/787,031, filed on Mar. 29, 2006.

(51) Int. Cl.
*H04L 29/06* (2006.01)

(52) U.S. Cl.
USPC ............. 375/240.24; 348/14.13; 348/E7.084; 375/240.27; 375/E7.09

(58) Field of Classification Search
USPC ........... 375/240.24, 240.2, 240.11; 348/14.13
See application file for complete search history.

(56) References Cited

U.S. PATENT DOCUMENTS

| 6,961,383 | B1 * | 11/2005 | Reibman et al. | 375/240.25 |
| 8,204,134 | B2 * | 6/2012 | Hannuksela | 375/240.27 |

(Continued)

FOREIGN PATENT DOCUMENTS

| WO | WO 03/063505 | 7/2003 |
| WO | WO03/094527 | 11/2003 |

(Continued)

OTHER PUBLICATIONS

I.Ahmad et al "Video transcoding: an overview of various techniques and research issues" IEEE. IEEE transaction on multimedia, vol. 7 No. 5, Oct. 2005, 12 pAGES.*

(Continued)

*Primary Examiner* — Morshed Mehedi
*Assistant Examiner* — Jason Lee
(74) *Attorney, Agent, or Firm* — Baker Botts L.L.P.

(57) ABSTRACT

A system for videoconferencing that offers, among other features, extremely low end-to-end delay as well as very high scalability. The system accommodates heterogeneous receivers and networks, as well as the best-effort nature of networks such as those based on the Internet Protocol. The system relies on scalable video coding to provide a coded representation of a source video signal at multiple temporal, quality, and spatial resolutions. These resolutions are represented by distinct bit-stream components that are created at each end-user encoder. System architecture and processes called SVC Thinning allow the separation of data into data used for prediction in other pictures and data not used for prediction in other pictures. SVC Thinning processes, which can be performed at video conferencing endpoints or at MCUs, can selectively remove or replace with fewer bits the data not used for prediction in other pictures from transmitted bit streams. This separation and selective removal or replacement of data for transmission allows a trade-off between scalability support (i.e. number of decodable video resolutions), error resiliency and coding efficiency.

20 Claims, 10 Drawing Sheets

(56) References Cited

U.S. PATENT DOCUMENTS

| | | | |
|---|---|---|---|
| 2002/0006161 A1* | 1/2002 | Van Der Schaar et al. | 375/240.11 |
| 2005/0220192 A1* | 10/2005 | Huang et al. | 375/240.16 |
| 2006/0008038 A1* | 1/2006 | Song et al. | 375/350 |
| 2006/0083303 A1* | 4/2006 | Han et al. | 375/240.08 |
| 2006/0114993 A1* | 6/2006 | Xiong et al. | 375/240.11 |
| 2006/0193379 A1* | 8/2006 | Ridge et al. | 375/240.01 |
| 2007/0071090 A1* | 3/2007 | Peng et al. | 375/240.2 |
| 2007/0121723 A1 | 5/2007 | Mathew et al. | |
| 2012/0014434 A1 | 1/2012 | Hong et al. | |

FOREIGN PATENT DOCUMENTS

| | | |
|---|---|---|
| WO | WO 2004/044710 | 5/2004 |
| WO | WO 2007/064082 | 6/2007 |

OTHER PUBLICATIONS

G.J. Sullivan et al "Rate-Distortion optimization for video compression" IEEE signal processing magazine, Nov. 1988, 17 pages.*

Ahmad, et al., "Video Transcoding: An Overview of Various Techniques and Research Issues", *IEEE Transactions on Multimedia*, vol. 7, No. 5, pp. 793-804, Oct. 1, 2005.

Mathew, et al., "Discardable bits and multi-layer RD estim", *ITU Study Group 16—Video Coding Experts Group—ISO/IEC MPEG & ITU-TVCEG (ISO/IEC JTC1/SC29/WG11 and ITU-TSG16 Q6)*, No. JVT-R050, Jan. 15, 2006.

Supplementary European Search Report issued on Jul. 20, 2010 in application No. EP07757156 (corresponding to U.S. Appl. No. 11/676,215).

U.S. Appl. No. 13/197,352, Jan. 28, 2013 Response to Non-Final Office Action.

Hannuksela, "Enhanced Concept of GOP", *JVT 2nd Meeting*: Geneva, CH, Document No. JVT-B042r1, 14 pages (2002) (XP030005042).

Reichel, et al., "Draft of Joint Scalable Video Model JSVM-4 Annex G", *JVT 17th Meeting*: Nice, France, Document No. JVT-Q201, 166 pages (2005) (XP030006255).

Reichel, et al., "Joint Scalable Video Model JSMV-4", *JVT 17th Meeting*: Nice, France, Document No. JVT-Q202, 41 pages (2005) (XP030006256).

Weigland, "Text of Final Committee Draft Joint Video Specification (ITU-T Rec. H.264/ISO/IEC 14496-10AVC)", *International Organisation forStandardisation Organisation Internationale De Normalisation ISO/IEC JTC1/SC29/WG11 Coding of Moving Pictures and Audio*, 208 pages (2002) (XP030012343).

Wenger, "Video Redundancy Coding in H.263+", *Proceedings AVSPN*, 6 pages (1997) (XP002966435).

U.S. Appl. No. 13/197,352, Mar. 12, 2013 Notice of Allowance.

U.S. Appl. No. 13/197,352, Dec. 7, 2012 Non-Final Office Action.

* cited by examiner

FIG. 1: VIDEOCONFERENCING SYSTEM 100

FIG. 3: LAYERED PICTURE CODING STRUCTURE: SPATIAL OR SNR LAYERING
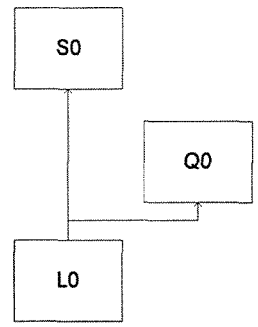

FIG. 4: LAYERED PICTURE CODING STRUCTURE: TEMPORAL LAYERING
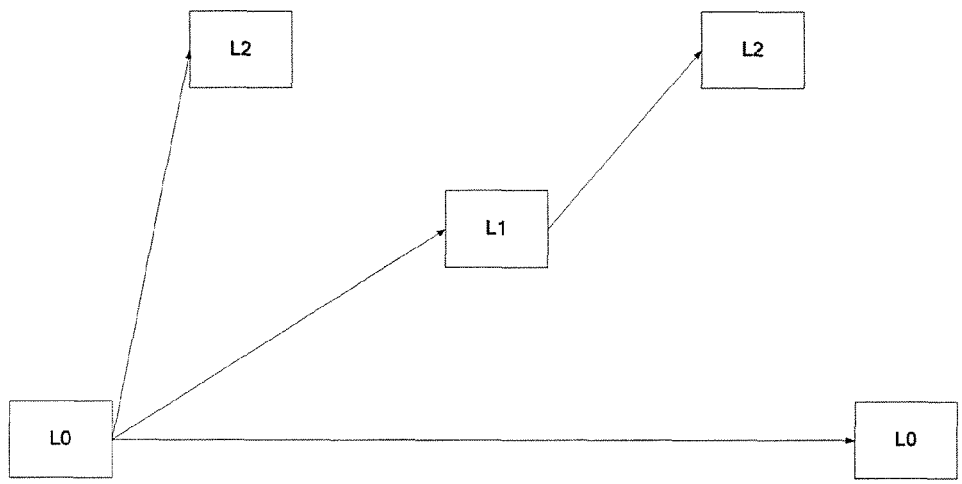

FIG. 5: LAYERED PICTURE CODING STRUCTURE
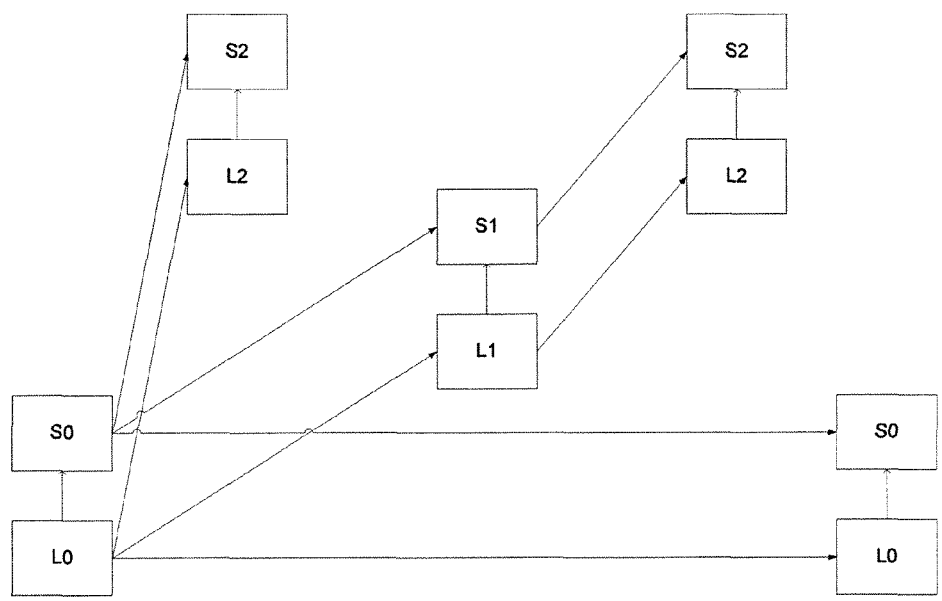

FIG. 6: THINNING UNIT 600
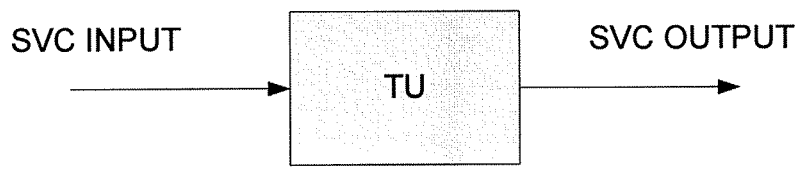

FIG. 7: REPLACEMENT SVC THINNING 700
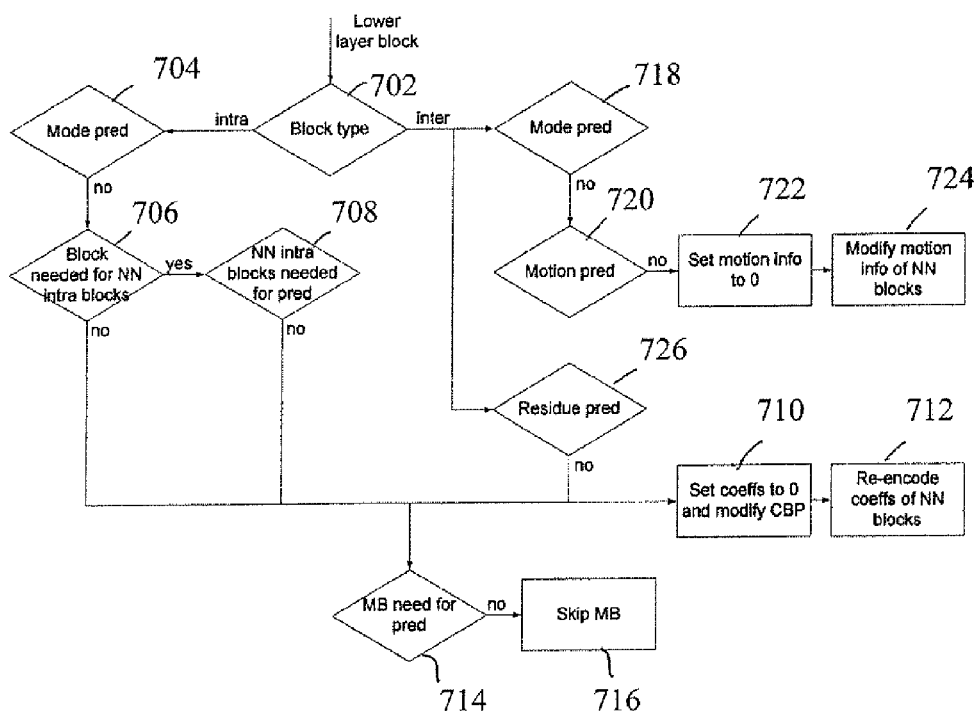

FIG. 8: REMOVAL SVC THINNING
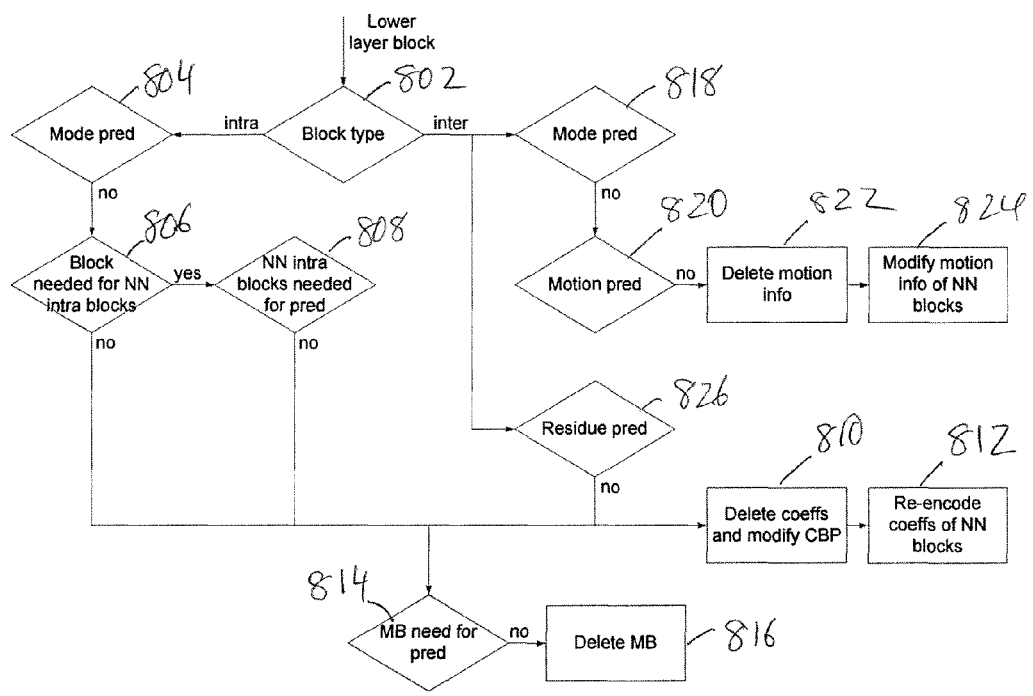

FIG. 9: THINNING SVCS 900
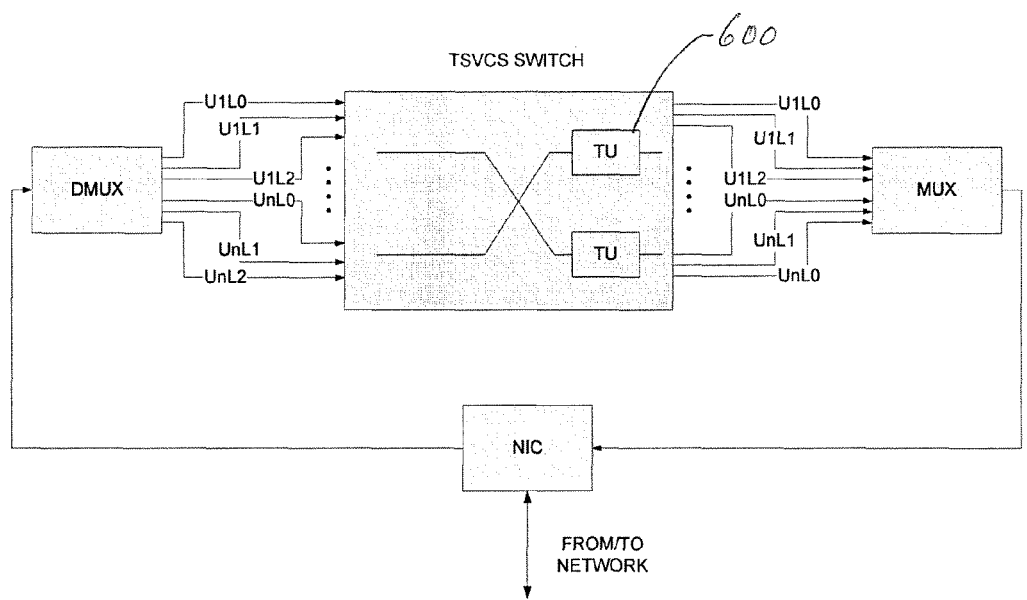

FIG. 10: BORDER TU
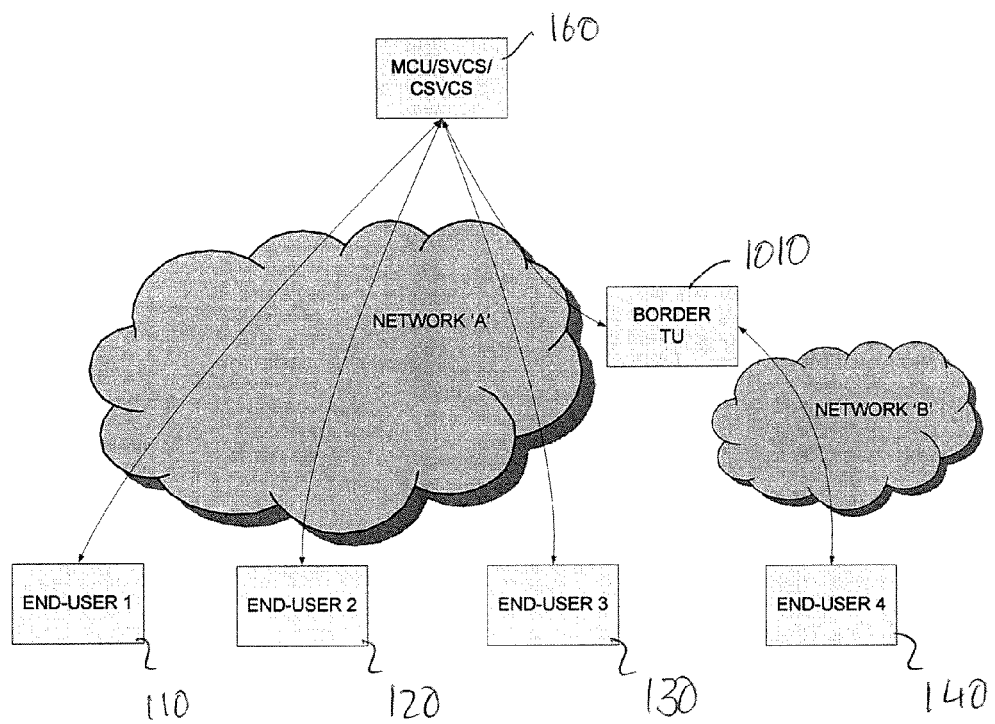

SYSTEM AND METHOD FOR THINNING OF SCALABLE VIDEO CODING BIT-STREAMS

CROSS-REFERENCE TO RELATED APPLICATIONS

This application claims the benefit of U.S. provisional patent application Ser. No. 60/774,094, filed Feb. 16, 2006. Further, this application is related to International patent application Nos. PCT/US06/28365, PCT/US06/028366, PCT/US06/028367, PCT/US06/028368, and PCT/US06/061815, and U.S. provisional patent application Nos. 60/786,997, filed Mar. 29, 2006, 60/827,469, filed Sep. 29, 2006, 60/778,760, Mar. 3, 2006 and 60/787,031, filed Mar. 29, 2006. All of the aforementioned priority and related applications, which are commonly assigned, are hereby incorporated by reference herein in their entireties.

FIELD OF THE INVENTION

The present invention relates to multimedia and telecommunications technology. In particular, the invention relates to systems and methods using scalable video coding techniques for videoconferencing between user endpoints over electronic communication networks, which can provide different levels of quality of service (QoS), and which the user endpoints can connect to using access devices and communication channels of differing capabilities.

BACKGROUND OF THE INVENTION

Modern videoconferencing systems allow two or more remote participants/endpoints to communicate video and audio with each other in real-time. When only two remote participants are involved, direct transmission of communications over suitable electronic networks between the two endpoints can be used. When more than two participants/endpoints are involved, a Multipoint Conferencing Unit (MCU), or bridge, is commonly used to connect to all the participants/endpoints. The MCU mediates communications between the multiple participants/endpoints, which may be connected, for example, in a star configuration. The MCU may also be used for point-to-point communication as well, to provide firewall traversal, rate matching, and other functions.

A videoconferencing system requires each user endpoint to be equipped with a device or devices that can encode and decode both video and audio. The encoder is used to transform local audio and video information into a form suitable for communicating to the other parties, whereas the decoder is used to decode and display the video images, or play back the audio, received from other videoconference participants. Traditionally, an end-user's own image is also displayed on his/her own display screen to provide feedback, for example, to ensure proper positioning of the person within the video window.

When more than two participants are present (and in some cases even with only two participants), one or more MCUs are typically used to coordinate communication between the various parties. The MCU's primary tasks are to mix the incoming audio signals so that a single audio stream is transmitted to all participants, and to mix the incoming video signals into a single video signal so that each of the participants is shown in a corresponding portion of a display frame of this mixed video signal show.

The video conferencing systems may use traditional video codecs that are specified to provide a single bitstream at a given spatial resolution and bitrate. For example, traditional video codecs whose bitstreams and decoding operation are standardized in ITU-T Recommendation H.261; ITU-T Recommendation H.262|ISO/IEC 13818-2 (MPEG-2 Video) Main profile; ITU-T Recommendation H.263 baseline profile; ISO/IEC 11172-2 (MPEG-1 Video); ISO/IEC 14496-2 simple profile or advanced simple profile; ITU-T Recommendation H.264|ISO/IEC 14496-10 (MPEG4-AVC) baseline profile or main profile or high profile, are specified to provide a single bitstream at a given spatial resolution and bitrate. In systems using the traditional video codecs, if a lower spatial resolution or lower bitrate is required for an encoded video signal (e.g., at a receiver endpoint) compared to the originally encoded spatial resolution or bitrate, then the full resolution signal must be received and decoded, potentially downscaled, and re-encoded with the desired lower spatial resolution or lower bitrate. The process of decoding, potentially downsampling, and re-encoding requires significant computational resources and typically adds significant subjective distortions to the video signal and delay to the video transmission.

A video compression technique that has been developed explicitly for heterogeneous environments is scalable coding. In scalable codecs, two or more bitstreams are generated for a given source video signal: a base layer, and one or more enhancement layers. The base layer offers a basic representation of the source signal at a given bitrate, spatial and temporal resolution. The video quality at a given spatial and temporal resolution is proportional to the bitrate. The enhancement layer(s) offer additional bits that can be used to increase video quality, spatial and/or temporal resolution.

Although scalable coding has been part of standards such as ITU-T Recommendation H.262|ISO/IEC 13818-2 (MPEG-2 Video) SNR scalable or spatially scalable or high profiles, it has not been used in the marketplace. The increased cost and complexity associated with scalable coding, as well as the lack of wide use of IP-based communication channels suitable for video have been considerable impediments to widespread adoption of scalable coding based technology for practical videoconferencing applications.

Now, commonly assigned International patent application PCT/US06/028365, which is incorporated herein by reference in its entirety, discloses scalable video coding techniques specifically addressing practical videoconferencing applications. The scalable video coding techniques or codecs enable novel architecture of videoconferencing systems, which is further described in commonly assigned International patent applications PCT/US06/028366, PCT/US06/028367, PCT/US06/027368, PCT/US06/061815, and PCT/US06/62569, which are incorporated herein by reference in their entirety.

The Scalable Video Coding Server (SVCS) and Compositing Scalable Video Coding Server (CSVCS) MCU architectures described in PCT/US06/028366 and PCT/US06/62569 enable the adaptation of incoming video signals to requested video resolutions of outgoing video signals according to the needs of the receiving participants. Compared to traditional MCUs, the SVCS and CSVCS architectures require only a small fraction of computational resources, and preserve the input video quality completely, but add only a small fraction of delay in the transmission path.

Currently, an extension of ITU-T Recommendation H.264|ISO/IEC 14496-10 is being standardized which offers a more efficient trade-off than previously standardized scalable video codecs. This extension is called SVC.

An SVC bit-stream typically represents multiple temporal, spatial, and SNR resolutions each of which can be decoded. The multiple resolutions are represented by base layer Network Abstraction Layer (NAL) units, and enhancement layer NAL units. The multiple resolutions of the same signal show statistical dependencies and can be efficiently coded using prediction. Prediction is done for macroblock modes (mb_type and prediction modes, in the case of intra), motion information (motion vector, sub_mb_type and picture reference index), as well as intra content and inter coding residuals enhancing rate-distortion performance of spatial or SNR scalability. The prediction for each of the elements described above is signaled in the enhancement layer through flags, i.e. only the data signaled for prediction in lower layers are needed for decoding the current layer.

Macroblock mode prediction is switched on a macroblock basis, indicating a choice between transmitting a new macroblock mode (as in H.264) and utilizing the macroblock mode in the reference. In SVC, the reference can be from the same layer, but can also be a lower layer macroblock.

Motion information prediction is switched on a macroblock or an 8×8 block basis between inter-picture motion vector prediction as in H.264 or inter-layer motion vector prediction from a reference in case of SVC. For the latter prediction type, the motion information from the base layer or layers with higher priority are re-used (for SNR scalability) or scaled (for spatial scalability) as predictors. In addition to the prediction switch, a motion vector refinement may be transmitted.

Inter coding residual prediction, which is switched on/off on a macroblock basis, re-uses (for SNR scalability) or up-samples (for spatial scalability) the inter coding residuals from a base layer or layers with higher priority, and potentially a residual signal that is added as an SNR enhancement to the predictor.

Similarly, intra content prediction, which is switched on/off on a macroblock basis, directly re-uses (for SNR scalability) or up-samples (for spatial scalability) the intra-coded signal from other pictures as a prediction from a base layer or layers with higher priority, and potentially a residual signal that is added as an SNR enhancement to the predictor.

As is known in the prior art, an SVC bitstream may be decodable at multiple temporal, spatial, and SNR resolutions. In video conferencing, a participant is only interested in a particular resolution. Hence, the data necessary to decode this resolution must be present in the received bit-stream. All other data can be discarded at any point in the path from the transmitting participant to the receiving participant, including the transmitting participant's encoder, and typically at an SVCS/CSVCS. When data transmission errors are expected, however, it may beneficial to include additional data (e.g., part of the base layer signal) to facilitate error recovery and error concealment.

For higher resolutions than the currently decoded resolution at a receiver, complete packets (NAL units) can be discarded (typically by an SVCS/CSVCS), such that only packets containing the currently decoded resolution are left in the bitstream transmitted or sent to the receiver. Furthermore, packets on which the decoding of the current resolution does not depend on can be discarded even when these are assigned to lower resolutions. For the two cases above, high-level syntax elements (from the NAL header information) can be utilized to identify which packets can be discarded.

Consideration is now being given to alternate or improved architectures for videoconferencing systems that use SVC coding techniques for video signals. In particular, attention is being directed to architectures that provide flexibility in processing SVC bit-streams.

SUMMARY OF THE INVENTION

Scalable videoconferencing systems and methods ("SVC Thinning") that provide flexibility in the processing of SVC bit-streams are provided. The system architecture enables tradeoffs in scalability support (i.e., number of decodable video resolutions), error resiliency, and coding efficiency for videoconferencing applications. A Thinning Unit (TU) processing block is provided for implementing SVC Thinning processing in the videoconferencing systems.

In a videoconferencing system based on SVC Thinning, each endpoint/participant transmits a scalable bitstream (base-layer plus one or more enhancement layers, e.g., coded using SVC) to a network MCU/SVCS/CSVCS. The transmission is performed using a corresponding number of physical or virtual channels.

In an alternative videoconferencing system based on SVC Thinning in which no MCU/SVCS/CSVCS is present, and the operations that are conducted at the MCU/SVCS/CSVCS in the first videoconferencing system are conducted at the transmitting video encoders. The alternative videoconferencing system may be suitable in a multicast scenario for video conferencing or for streaming where the encoding consists a scalable real-time encoder or a file.

In the first videoconferencing system based on SVC Thinning, the MCU/SVCS/CSVCS may select or process parts of the scalable bitstream from each participant/endpoint according to the requirements that are based on properties and/or settings of a particular recipient/endpoint location. The selection may be based on, for example, the recipient's bandwidth and desired video resolution(s).

The MCU/SVCS/CSVCS collects or composes the selected scalable bitstream parts into one (or more) video bitstreams that can be decoded by one (or more) decoders.

No or minimal signal processing is required of an SVCS/CSVCS in this respect; the SVCS/CSVCS may simply read the packet headers of the incoming data and selectively multiplex the appropriate packets into the access units of the output bitstream and transmit it to each of the participants.

Alternatively, the MCU/SVCS/CSVCS may process parts of the incoming bit-stream and modify contents of packets in the compressed domain and selectively multiplex the appropriate packets into the access units of the output bitstream and transmit it to each of the participants.

In the SVC Thinning architecture, only the data that are used for prediction in the currently decoded resolution are transmitted to an endpoint in a video conferencing scenario. Conversely, the data that are not used for prediction in the currently decoded resolution are not transmitted to the endpoint, but are discarded For convenience, the operations or processes associated with selectively discarding and transmitting data in the SVC Thinning architecture and the architecture itself, are both referred to herein as SVC Thinning.

SVC Thinning can be done in two ways: by replacement of syntax elements ("replacement thinning") or removal of them ("removal thinning").

SVC Thinning proceeds by parsing and re-encoding bit-streams of the affected NAL units.

SVC Thinning can be applied to all switched predictors in scalable video coding such as macroblock modes, motion information, inter coding residuals, and intra content.

SVC Thinning can be conducted in various embodiments, trading-off computational power at the SVCS/CSVCS with bandwidth between encoder-SVCS/CSVCS. SVC Thinning may be performed either at the SVC encoder or at the MCU/SVCS/CSVCS.

SVC Thinning may be viewed as a trade-off between coding efficiency and error resilience/random access. On one hand, SVC Thinning eliminates information not necessary for decoding, hence increases coding efficiency. On the other hand, at the same time SVC Thinning eliminates redundancy that is essential for error resilience/random access.

The tradeoffs may be balanced in applying SVC Thinning selectively to access units in consideration of their properties. As an example, for access units for which error resilience or random access properties are important SVC Thinning may not be used. Conversely,—for other access units for which error resilience or random access properties are not as important, SVC Thinning may be advantageously used.

An exemplary embodiment of a videoconferencing system in accordance with the present invention may include (1) a network that provides differentiated Quality of Service (QoS), i.e., provides a high reliability channel for a portion of the required total bandwidth; (2) a video coding technique that offers scalability in terms of any of temporal, quality, or spatial resolution, at different transmission bit-rate levels (such as the one disclosed in International patent application PCT/US06/028365); (3) a new type of MCU referred to as a SVCS/CSVCS (such as the one disclosed in International patent applications PCT/US06/028366 and PCT/US06/62569), that can perform its coordinating functions with minimal delay and with extremely low processing cost; and (4) end-user terminals, which can be dedicated hardware systems, digital signal processors, or general purpose PCs that are capable of running multiple instances of video decoders and one instance of a video encoder.

Further, the functionalities of a traditional MCU, and the SVCS and CSVCS (disclosed in International patent applications PCT/US06/028366, PCT/US06/62569, and PCT/US06/061815, and provisional U.S. patent applications 60/778,760, and 60/787,031) may be integrated with the SVC thinning functionalities described herein in a single system unit in various combinations. The MCU, SVCS, and CSVCS and the SVC Thinning functionalities can be physically located on the same system unit (e.g., Thinning Unit 600, FIG. 6), or distributed on different system units, and at different physical locations. For example, a video conferencing system may use a traditional MCU for the audio component of a videoconferencing session, but have a SVCS/CSVCS with SVC Thinning to handle the video component. In such a system a single audio decoder is required of the end-user terminals.

The additional processing described herein for the SVC Thinning functionality can complement the functionality of SVCS/CSVCS. All the functionality and advantages of the SVCS/CSVCS are maintained, but instead of sending complete SVC bit-streams to each endpoint the sent individual streams have bit rates that are potentially reduced by SVC Thinning.

BRIEF DESCRIPTION OF THE DRAWINGS

Further features, the nature, and various advantages of the invention will be more apparent from the following detailed description of the preferred embodiments and the accompanying drawings in which:

FIG. 3 is a block diagram illustrating an exemplary a layered picture structure for spatial or SNR layering in accordance with the principles of the present invention;

FIG. 4 is a block diagram illustrating an exemplary a threaded layered picture structure for temporal layering in accordance with the principles of the present invention;

FIG. 5 is a block diagram illustrating an exemplary a threaded layered picture structure for spatial or SNR layering with differing prediction paths for the base and enhancement layers in accordance with the principles of the present invention;

FIG. 6 is a block diagram illustrating a one-input, one-output Thinning Unit (TU) in accordance with the principles of the present invention.

FIG. 7 is a block diagram illustrating the replacement SVC thinning process in accordance with the principles of the present invention;

FIG. 8 is a block diagram illustrating the removal SVC thinning process in accordance with the principles of the present invention;

FIG. 9 is a block diagram illustrating the architecture of a Thinning SVCS (TSVCS) in accordance with the principles of the present invention; and FIG. 10 is a block diagram illustrating an exemplary architecture for a videoconferencing system with a border TU in accordance with the principles of the present invention.

Figure 1:
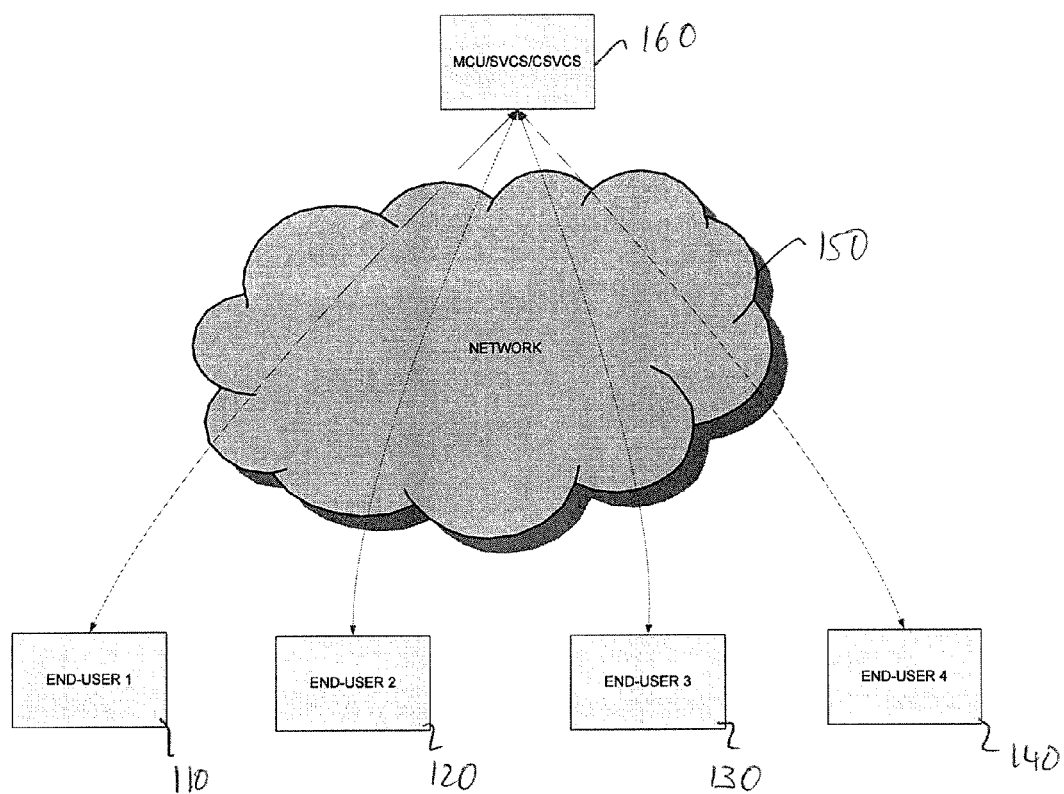
FIG. 1 is a block diagram illustrating an exemplary architecture for a videoconferencing system in accordance with the principles of the present invention.

Throughout the figures the same reference numerals and characters, unless otherwise stated, are used to denote like features, elements, components or portions of the illustrated embodiments. Moreover, while the present invention will now be described in detail with reference to the figures, it is done so in connection with the illustrative embodiments.

DETAILED DESCRIPTION OF THE INVENTION

Video conferencing systems and methods based on SVC coding are provided. The systems and methods (collectively referred to herein as "SVC Thinning") are designed to provide flexibility in processing SVC bitstreams for videoconferencing applications. In particular, SVC Thinning provides system and processing functionalities for selectively discarding or not transmitting SVC bitstream portions to receiver/endpoints in response to receiver/endpoints needs or properties.

FIG. 1 shows an exemplary embodiment of a videoconferencing system 100 having SVC Thinning functionalities according to the present invention. System 100 may include a plurality of end-user terminals 110-140, a network 150, and one or more MCU/SVCS/CSVCS 160. The network enables communication between the end-user terminals and the MCU/SVCS/CSVCS. The SVC Thinning functionalities described herein may be placed in MCU/SVCS/CSVCS 160, or in one or more endpoints (e.g. 110-140).

Figure 2:
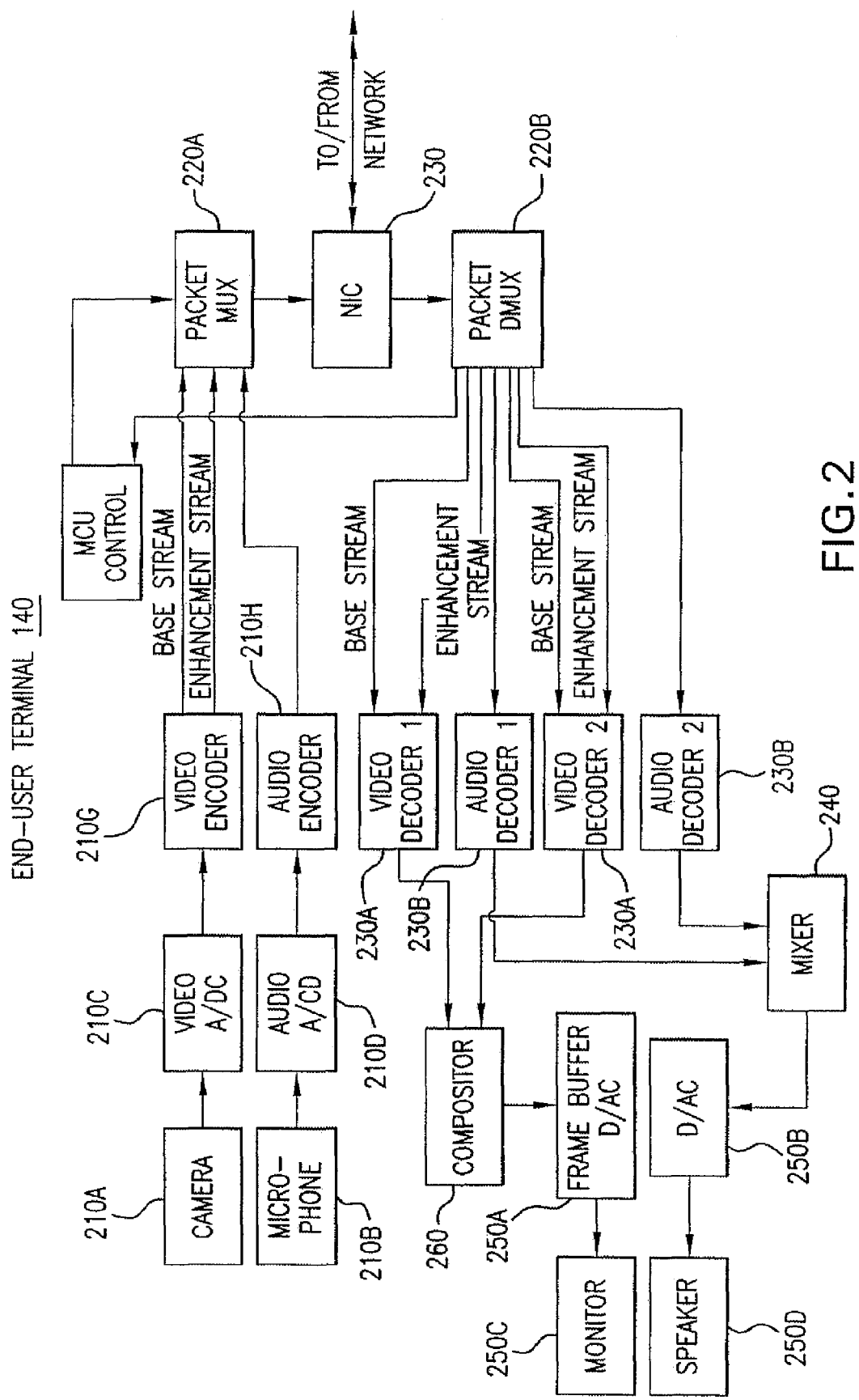
FIG. 2 is a block diagram illustrating an exemplary architecture for an end-user terminal in accordance with the principles of the present invention.

In system 100, an end-user terminal (e.g. terminals 110-140) has several components for use in videoconferencing. FIG. 2 shows the architecture of an end-user terminal 140, which is designed for use with videoconferencing systems (e.g., system 100) based on single layer coding. Terminal 140 includes human interface input/output devices (e.g., a camera 210A, a microphone 210B, a video display 250C, a speaker 250D), and a network interface controller card (NIC) 230 coupled to input and output signal multiplexer and demultiplexer units (e.g., packet MUX 220A and packet DMUX 220B). NIC 230 may be a standard hardware component, such as an Ethernet LAN adapter, or any other suitable network interface device.

Camera 210A and microphone 210B are designed to capture participant video and audio signals, respectively, for transmission to other conferencing participants. Conversely, video display 250C and speaker 250D are designed to display and play back video and audio signals received from other participants, respectively. Video display 250C may also be configured to optionally display participant/terminal 140's own video. Camera 210A and microphone 210B outputs are coupled to video and audio encoders 210G and 210H via analog-to-digital converters 210E and 210F, respectively. Video and audio encoders 210G and 210H are designed to compress input video and audio digital signals in order to reduce the bandwidths necessary for transmission of the signals over the electronic communications network. The input video signal may be live, or pre-recorded and stored video signals. The encoder 210G compresses the local digital video signals in order to minimize the bandwidth necessary for transmission of the signals. In a preferred embodiment, the output data are packetized in RTP packets and transmitted over an IP-based network.

In system 100, the audio signal may be encoded using any of the several techniques known in the art (e.g., ITU-T Recommendation G.711, and ISO/IEC 11172-3 (MPEG-1 Audio)) In a preferred embodiment, G.711 encoding may be employed for audio. The output of the audio encoder is sent to the multiplexer (MUX) 220A for transmission over the network via the Network Interface Controller (NIC) 230.

Packet MUX 220A performs traditional multiplexing using the RTP protocol, and can also implement any needed QoS-related protocol processing. Each stream of data of the terminal is transmitted in its own virtual channel, or port number in IP terminology.

One embodiment of the inventive system 100 utilizes bit-streams conforming to SVC for the input video signals and/or the output video signal of the MCU/SVCS/CSVCS. This embodiment of the present invention is referred to herein as the SVC embodiment. It will, however, be understood that the invention is not limited to systems using the standardized SVC codecs, but is also applicable to other scalable video codecs.

An SVC bit-stream typically represents multiple spatial and SNR resolutions each of which can be decoded. The multiple resolutions are represented by base layer NAL units and enhancement layer NAL units. The multiple resolutions of the same signal show statistical dependencies and can be efficiently coded using prediction. Prediction is done for elements such as macroblock modes, motion information, intra content and inter coding residuals enhancing rate-distortion performance of spatial or SNR scalability. The prediction for each of the elements is signaled in the enhancement layer through flags, i.e. only the data signaled for prediction in lower layers are needed for decoding the current layer.

A particular set of NAL units assigned to a given resolution is treated by SVC Thinning in different ways depending on its (the NAL units) role in the decoding process. Consider an example in which K resolutions are present in the SVC bit-stream and the resolutions are numbered as k=0 to K−1. These K resolutions can either be spatial or SNR resolutions or a mix of them. Further, assume a resolution with a higher k number depends on resolutions with lower k numbers through the switched prediction algorithms in SVC. When decoding at a resolution X with 0<x≤K−1, all packets assigned to resolutions with a number larger than X can be discarded. All packets assigned to resolutions with number smaller than X (hereinafter called "thinnable" or "T-type" NAL units) can be modified and generally reduced in byte size by SVC Thinning.

It is again noted that the present invention is not limited to SVC bit-streams having the exemplary prediction dependency structures. but is also applicable to SVC bit-streams with other dependency structures (e.g., having a NAL unit of resolution X, which is not dependent on a NAL unit with a lower resolution Y, with 0<y<X).

SVC Thinning can be conducted by one of two alternate procedures—Replacement SVC Thinning and Removal SVC Thinning.

Replacement SVC Thinning involves replacing those bits in T-type NAL units, which are neither directly nor indirectly being used for prediction in NAL units of resolution X, by other bits that are a fewer number of bits than the replaced bits. For example, a coded macroblock potentially containing motion vector(s) and residual coefficient(s) can be replaced by the syntax elements mb_skip_flag or mb_skip_run, signaling that the macroblock(s) is skipped. This procedure has the advantage that T-type NAL units conform to SVC after the application of SVC Thinning, and the disadvantage of some bit-rate overhead.

Removal SVC Thinning involves removing those bits in T-type NAL units that are neither directly nor indirectly being used for prediction in NAL units of resolution X. In this case, the parsing of the macroblocks in T-type NAL units is controlled by the data in NAL units of resolution X. This procedure has the disadvantage that T-type NAL units do not conform to SVC after SVC Thinning, but has the advantage of a reduced bit-rate overhead compared to the Replacement SVC Thinning. A further potential disadvantage is that enhancement layer data have to be decoded prior to decoding all of the T-type NAL units, which the enhancement layer depends on.

SVC Thinning proceeds by parsing and re-encoding bit-streams of the T-type NAL units amongst the NAL units of resolution X. Bits in the T-type NAL units are either replaced or removed when they are not utilized to decode a predictor that is used directly or indirectly for decoding other T-type NAL units or the NAL units of resolution X. After thinning of the T-type NAL units, the total bits used to represent resolution X is decreased.

If the dependency structure between the K resolutions is more complicated than shown, for example, in FIG. 3, multiple versions may result from SVC Thinning for T-type NAL units. With reference to FIG. 3, the result of thinning of layer L0 will be different according to whether the target resolution is that of S0 (spatial enhancement) or that of Q0 (quality enhancement).

SVC allows for macroblock mode prediction, motion information prediction, inter coding residual prediction, intra content prediction etc. Each of these SVC prediction methods is amenable to SVC Thinning.

Macroblock mode prediction in SVC is switched on a macroblock basis between either transmitting a new macroblock mode information as in H.264 or utilizing the information in T-type NAL units. In the case the information in T-type NAL units is neither explicitly nor implicitly needed for decoding resolution X, it can be replaced by fewer bits, e.g. by syntax elements mb_skip_flag or mb_skip_run, by SVC Thinning. Such a replacement would also result in the removal or modification of other syntax elements of the macroblock and neighboring macroblocks in the T-type NAL units.

In SVC, motion information prediction is switched on a macroblock or 8×8 block or other block-size basis between inter-picture motion information prediction (e.g. as in H.264) or motion information prediction from a T-type NAL unit. For the latter inter-layer prediction type, the motion information from other T-type NAL units are re-used or scaled as predictors. In addition to the prediction switch, a motion vector refinement may be transmitted. Motion vector refinements consist of transmitted additional motion vectors that are added to the motion vector predictions resulting in motion vectors that can be represented exactly using H.264 syntax. In case the T-type NAL unit motion information is not used for prediction in resolution X, it can be replaced by fewer bits, e.g., a motion vector can be modified to result in a motion vector difference being equal to 0 for both components, by SVC Thinning.

In SVC, inter coding residual prediction is switched on/off on a macroblock basis. It re-uses (SNR scalability) or up-samples (spatial scalability) the inter coding residuals from a T-type NAL unit, potentially followed by a residual signal that is added as an SNR enhancement to the predictor. If a block is not predicted from the T-type NAL unit for coding the higher resolution, when decoding the higher resolution it does not need to be transmitted. The bits associated with the residual can then be replaced by fewer bits, e.g. by setting the syntax element coded_block_pattern so that it indicates that the corresponding blocks only contain coefficients with values being equal to 0, by SVC Thinning. It is noted that a method similar to the replacement of residuals has been proposed in M. Mathew, W.-J. Han, and K. Lee, "Discardable bits and Multi-layer RD estimation for Single loop decoding," Joint Video Team, Doc. JVT-R050, Bangkok, Thailand January 2006. However, the present SVC Thinning method affects all other syntax elements (including macroblock types, motion vectors, intra content) and not merely residuals, and further adds the possibility of removal of syntax elements.

In SVC intra content prediction is switched on/off on a macroblock basis and re-uses (SNR scalability) or up-samples (spatial scalability) the intra-coded signal from T-type NAL units. It is potentially followed by a residual signal that is added as an SNR enhancement to the predictor. If a macroblock is not predicted from T-type NAL units for coding the higher resolution, when decoding the higher resolution, the macroblock does not need to be transmitted. The bits associated with the intra macroblock can then be replaced by fewer bits, e.g. by syntax elements mb_skip_flag or mb_skip_run, by SVC Thinning.

The SVC Thinning operations (i.e., replacement thinning and removal thinning processes) exploit specific features of the SVC syntax. In its most general form, thinning is just a compressed-domain operation applied on a compressed digital video signal. FIG. 6 shows a "Thinning Unit" (TU) 600, which is simply a processing block with one input and one output. The input signal is assumed to be an SVC video stream with two or more layers, and the output signal is also an SVC stream. It is noted that in some cases, as explained below, it is possible that some of the layers contained in the output signal are not compliant to the SVC syntax. Furthermore, it is noted that TU 600 may have more than one input and more than one output (not shown). In this case each output is connected to at most one input, and the SVC Thinning operations is performed on the particular input-output pairs in the same manner as the one-input one-output pair case shown in FIG. 6.

FIG. 7 shows a flow diagram of exemplary steps 702-726 in replacement thinning process 700. With reference to the text legends in FIG. 7 (and FIG. 8), 'Block' is the lower layer block corresponding to the target layer macroblock in the input SVC stream (FIG. 6), 'CBP' refers to the coded_block_pattern that indicates which transform blocks contain non-zero coefficients, and 'NN' refers to the neighbor to the right or below of the current block. For each target layer macroblock (MB), the corresponding lower layer block (a block may be smaller than or equal to the size of MB) is located.

The thinning process 700 is applied on the lower layer block ('current block') as follows:

If the current block is intra coded (702) and mode prediction is not used in the target layer (704), then the following applies:
If the current block is not needed for decoding neighboring blocks (not used for intra-prediction) (706) or none of the neighboring blocks that predict from the current block is used for predicting the target layer (708), then apply the following:
Set coefficients to 0 and modify coded_block_pattern (CBP) (722), and
Re-encode coefficients of neighboring blocks if needed (the context used to encode neighboring blocks may get changed due to zeroing-out of the current block's coefficients) (724).
If the MB containing the current block is not used for predicting the target layer (714), then skip the MB (716). The skipping in non-I and non-SI slices is signaled by replacing the MB data by either the mb_skip_run syntax element (when CAVLC is used), or the mb_skip_flag syntax element (when CABAC is used). The neighboring blocks' motion information is also examined, and modified if needed, since the predicted motion information used for encoding the neighboring block's motion information may get changed as a result of the skip.
Otherwise if the current block is inter coded (702) then the following applies:
If mode prediction is not used (718) and motion prediction is not used (720), then apply the following:
Set motion information to 0 (722), and
Modify neighboring blocks' motion information (724), if needed.
If residue prediction is not used (726), then apply the following
Set coefficients to 0 and modify CBP (710), and
Re-encode coefficients of neighboring blocks (712), if needed.
If the MB containing the current block is not used for predicting the target layer (714), then skip the MB (716).
Otherwise, do not apply thinning.

Similarly, FIG. 8 shows a flow diagram of exemplary steps 802-826 in removal thinning process 800. For each target layer MB, the corresponding lower layer block is located, and the thinning process 800 is applied as follows:
If the current block is intra coded (802) and mode prediction is not used in the target layer (804), then the following applies
If the current block is not needed for decoding neighboring blocks (not used for intra-prediction) (806) or if none of the neighboring blocks that predict from the current block are used for predicting the target layer (808), then apply the following:
Delete coefficients and modify CBP (810), and
Re-encode coefficients of neighboring blocks assuming current block has 0 coefficients (812).
If the MB containing the current block is not used for predicting the target layer (814), then delete MB (816). This includes modifying neighboring blocks' motion information.
Otherwise if the current block is inter coded (802), then the following applies:
If mode prediction is not used (818) and motion prediction is not used (820), then apply the following:
Set motion information to 0 (822), and
Modify neighboring blocks' motion information (824), if needed.

If residue prediction is not used (826), then apply the following:
Delete coefficients and modify CBP (810), and
Re-encode coefficients of neighboring blocks assuming that the current block has all 0 coefficients (812).
If the MB containing the current block is not used for predicting the target layer (814), then delete MB (816).
Otherwise, do not apply thinning The SVC Thinning operations (e.g., processes 700 or 800) may be performed either by the SVCS/CSVCS (e.g., at SVCS/CSVCS 160, FIG. 1) itself, or by an encoder (e.g., an associated encoder (SVC encoder) or an encoder at the transmitting endpoint). The choice presents a tradeoff primarily of SVCS/CSVCS computational power and the bandwidth between the encoder and SVCS/CSVC. Computational power requirements at the encoder itself are expected to minimal. The SVC Thinning operations performed at the SVCS/CSVCS may be performed with or without side information.

With SVC Thinning at the SVC encoder, two (or more) versions of NAL units are produced by the SVC encoder and sent to the SVCS/CSVCS, which in turn decides which NAL units to forward to which decoder (at the endpoints). This creates bitrate overhead between the encoder and SVCS/CSVCS. In this embodiment, the TU 600 processing block is either integrated with the SVC encoder, or it can be applied after regular encoding, at the transmitting endpoint. The two types of NAL units created by the SVC encoder can be encoded in two different ways.

First, the SVC encoder can form two different kinds of T-type NAL units. The first kind are NAL units used for predicting higher layers ("prediction reference slices") and the other kind are non-prediction reference slices that may be predicted from prediction reference slices. The discardable_flag may be used to provide high-level syntax support for distinguishing the two types on slices and to determine prediction dependencies. This division into prediction reference and non-prediction reference slices is unlikely to drastically decrease compression efficiency, because if a prediction reference slice could have been benefiting from prediction based on information included in the non-prediction reference slices, the encoder would have made this encoding choice, and those blocks would be classified as prediction reference class blocks. The SVCS/CSVCS will then separate these streams as needed Second, the SVC encoder can form different NAL units for T-type NAL units in such a way that it creates prediction reference slices as described above and, in addition to that, a slice that contains all the data.

When SVC Thinning operations are at the SVCS/CSVCS itself with side information, the SVC encoder produces regular NAL units and also sends side information to assist the SVCS/CSVCS in SVC Thinning. Such side information could be a macroblock-wise bit map providing information on what needs to the thinned from T-type NAL units avoiding the parsing of the complete enhancement layer.

When the SVC Thinning operations are at the SVCS/CSVCS itself without side information, the SVC encoder produces regular NAL units and nothing else. The SVCS/CSVCS performs the complete SVC Thinning operations. FIG. 9 shows an exemplary architecture for a "Thinning SVCS" (TSVCS) 900. TSVCS 900 has the structure of a regular SVCS (e.g., as described in PCT/US06/28365) including a Network Interface Controller (NIC) through which packets are received and transmitted, a switching element that receives packets from multiple users U1 through Un, with each user transmitting, in this specific example, three layers (e.g., U1L0, U1L1, and U1L2). A regular SVCS simply decides which packets from the inputs are transmitted to which output, and hence to which user, based on user preferences or system conditions. In a TSVCS 900, the outputs of the SVCS are further equipped with Thinning Units (e.g., TU 600) so that the TSVCS can selectively apply thinning to the outputted signals when necessary.

It is noted that the SVC encoder can configured to anticipate that the SVC thinning process may be applied, either at the encoder itself or at an MCU/SVCS/CSVCS, and encode the video bitstream in a way that facilitates thinning ("thinning aware encoding"). Specifically, inter-layer predictions can be organized such that the subsequent replacement or removal of lower layer data is simplified. As an extreme example of thinning aware encoding, an encoder may produce a simulcast encoding, where two bitstreams at different resolutions are coded completely independently, and where removal thinning amounts to complete elimination of the base layer bitstream. In this extreme case, the coding efficiency is identical to that of single-layer coding. A videoconferencing example where this extreme case may be encountered is the case of two recipients/participants who reside on perfect (lossless) networks, and where each participant requests a different spatial resolution. In this case, the transmitting endpoint will simulcast the two bitstreams, and the MCU/SVCS/CSVCS will route one bitstream to its intended receiving endpoint, and the second one bitstream to its intended receiving endpoint, in a binary fashion. In general, however, such ideal extreme conditions rarely exist. The partitioning of data between the base and enhancement layers in terms of coding dependency and bit rate are subject to design considerations such as network bitrate availability and error resilience.

In the SVC Thinning operations described previously (e.g., with reference to FIGS. 7 and 8), the target layer was transmitted intact by an encoder or MCU/SVCS/CSVCS that performs thinning. It is possible, however, to further allow the target layer NAL units to be modified as well. For example, when motion vector prediction from the base layer is used at the target layer MB, it is possible to re-encode the target layer MB motion information with the resultant motion vector values without using prediction. This feature can further facilitate the increase in coding efficiency, since it allows more MB data from the base layer to be replaced or removed.

SVC Thinning is a way to further optimize the coding efficiency of the scalable video coding process, when a single resolution is desirable at the receiver and when the packet loss rate is zero or very small and when no random access requirements affect SVC coding. When errors are present in the system, however, the information included in the lower levels is useful for video error concealment. When no errors are present, the MCU/SVCS/CSVCS may apply SVC Thinning to eliminate or discard any information not required by the decoder in order to display the desired resolution. However, when errors are present the MCU/SVCS/CSVCS may be configured to choose to retain information only relevant for the lower levels in whole or in part. The higher the error rate present in the system, the more such information will be retained. This configuration allows combination of SVC Thinning with inter-layer error concealment techniques, which are described, for example, in International patent application no. PCT/US06/061815 and provisional U.S. patent application Nos. 60/778,760 and 60/787,031, to maintain frame rate.

SVC Thinning can also be applied partially in tradeoff or consideration of error resilience and random access in videoconferencing systems. FIGS. 4 and 5 show exemplary layered temporal prediction structures in which the pictures labeled as L0, L1, and L2 are a threaded prediction chain. When one of these pictures is not available for reference at the receiving participant's decoder, spatio-temporal error propagation occurs and, with that, highly visible subjective distortions are typically introduced. The pictures labeled L2 are not used as reference pictures for inter prediction. Hence, pictures labeled L2 (and to some extent also pictures labeled as L1) are much less important for proving random access (i.e., a participant entering a conference or switching to a different resolution) or error resilience. This is due to the fact that the prediction chain for pictures L2 and L1 is terminated after some short time. SVC Thinning can be applied selectively to different pictures. In this example, it can be applied to the higher temporal resolution pictures, i.e., pictures L2 and L1, allowing the decoder to maintain decodable low temporal frequency lower resolution image (picture L0). Moreover, the partial SVC Thinning approach also preserves features of error resilience schemes when not applied to L0 pictures.

In an error resilience scheme, the sending participants (each running a scalable video encoder), the MCU/SVCS/CSVCS, and receiving participant (running the scalable video decoder) maintain bi-directional control channels between them. The control channel from the sending participant to the MCU/SVCS/CSVCS and from the MCU/SVCS/CSVCS to the receiving participant is called the forward control channel. The control channel from the receiving participant to the MCU/SVCS/CSVCS and from the MCU/SVCS/CSVCS to the sending participant is called the backward control channel. Prior to the actual communication, typically, a capability exchange is conducted. This capability exchange includes the signaling of the range of error resilience condition/requirements on the channel to each receiving participant. During the session, the receiving participant can update the error condition/requirements through the backward control channel. The system unit performing the SVC Thinning (e.g., a transmitting endpoint or MCU/SVCS/CSVCS) can then adapt the thinning process according to the updated error condition/requirements.

It is noted that TU 600 designed as a SVC thinning process block, may be advantageously used in a border device that interconnects two networks. In this case, TU 600 operates as a single-input single-output device (i.e., without MCU/SVCS/CSVCS functionality) for the purposes of optimizing its input video signal received over one network to the conditions of the other network used to transport its output. The operation of such a border TU can be facilitated through the use of a feedback channel, through which the receiving endpoint communicates network performance indicators. FIG. 10 shows an example of a videoconferencing system 1000 in which the thinning processing block is in a border device 1010 ("BORDER TU") connecting two networks A and B. BORDER TU may be a router or bridge equipped with one or more TUs. In the videoconferencing system, end user 140 is situated in network (B) and end-users 110-130 are situated in network A. For this particular example, videoconferencing system 1000 may use an SVCS for mediating the videoconferencing signals, but the technique is applicable to MCU/CSVCS designs, as well as point-to-point connections (i.e., without a server). In operation BORDER TU may apply thinning on the data transmitted to end user 140 from one or more of the three end users 110-130 on network A and/or on the data transmitted from end user 140.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

For example, SVC Thinning has been described herein using examples in which an input bitstream is thinned by an encoder or a Thinning Server (TS) in response to a single target resolution requirement of single receiving endpoint. Thus, if there are different target resolutions requirements for different receiving endpoints, the single-target resolution thinning operations described herein (i.e., removal and replacement thinning) may be performed repeatedly (e.g., sequentially) on input bitstreams to separately produce different output bitstreams corresponding to the different target resolution. However, it is readily understood that the thinning operations to produce the different output bitstreams may be merged or cascaded, for example, to exploit overlap or non-orthogonality in the target resolutions data sets. Such cascaded operations may be efficient and advantageous, for example, when one and more TS are deployed in a cascaded arrangement. Consider the case where an input bit stream has three spatial layers (S0, S1 and S2), but where a first recipient requires only resolution S1 and a second recipient requires resolution S2. A cascade arrangement may more efficiently produce the target output bitstreams i.e., (thinned S0, S1) and (thinned S0, thinned S1, S2). At the first stage in the cascade, the input S0 could be thinned for both S1 and S2 targets. At a second stage, the input S1 (or S1 copy) is thinned for S2. Similarly, if thinning is performed at the encoder, then in this particular example the encoder can directly produce a thinned version of S0 since none of the intended recipients requires decoding at the S0 resolution.

It also will be understood that the systems and methods of the present invention can be implemented using any suitable combination of hardware and software. The software (i.e., instructions) for implementing and operating the aforementioned systems and methods can be provided on computer-readable media, which can include without limitation, firmware, memory, storage devices, microcontrollers, microprocessors, integrated circuits, ASICS, on-line downloadable media, and other available media.

We claim:

1. A method for processing an input digital video signal, encoded in a scalable video coding format that supports one or more of spatial and quality scalability in order to produce an output digital video signal at an intended resolution, the method comprising:

for the output signal, replacing information in a plurality of scalable layers of at least one input video signal lower than a target layer that corresponds to the intended resolution such that information not required to decode the output video signal at the intended resolution is replaced by information that requires fewer bits in the output video signal, and wherein the output video signal with the replaced information is still conforming to the scalable video coding format, wherein a side information input data enables the replacement of the information not required to decode the output video signal at the intended resolution of the side information input data without fully parsing the entire input video signal.

2. The method of claim 1 wherein the scalable video coding format is H.264 SVC and wherein the information not required to decode the output video signal at the intended resolution:

comprises macroblocks that are not used for predicting the target layer, wherein the replacing comprises signaling each of the macroblocks are skipped;

and wherein encoding of neighboring blocks is modified if the information replacement affects the encoding of the neighboring blocks.

3. A method for processing an input digital video signal, encoded in a scalable video coding format that supports one or more of spatial and quality scalability in order to produce an output digital video signal at an intended resolution, the method comprising:

for the output signal, removing information in a plurality of scalable layers of at least one input video signal lower than a target layer that corresponds to the intended resolution such that information not required to decode the output video signal at the intended resolution is removed in the output video signal, wherein a side information input data enables the elimination of the information not required to decode the output video signal at the intended resolution of the side information input data without fully parsing the entire input video signal.

4. The method of claim 3, wherein the information not required to decode the output video signal at the intended resolution comprises macroblocks that are not used for predicting the target layer, wherein the removing comprises removing each of the macroblocks;

and wherein encoding of neighboring blocks is modified if the information replacement affects the encoding of the neighboring blocks.

5. The method of claim 1 wherein the scalable video coding format is H.264 SVC and wherein the information not required to decode the output video signal at the intended resolution comprises intra blocks where mode prediction is not used and either each of the intra blocks is not used for intra prediction by neighboring blocks, or none of the neighboring blocks are used for predicting the target layer, wherein the replacing comprises setting coefficients of each of the intra blocks to zero and accordingly modifying a coded block pattern of each of the intra blocks;

and wherein encoding of neighboring blocks is modified if the information replacement affects the encoding of the neighboring blocks.

6. The method of claim 1 wherein the scalable video coding format is H.264 SVC and wherein the information not required to decode the output video signal at the intended resolution comprises inter blocks where no mode prediction or no motion prediction are used, wherein the replacing comprises setting motion information of each of the inter blocks to zero;

and wherein encoding of neighboring blocks is modified if the information replacement affects the encoding of the neighboring blocks.

7. The method of claim 1 wherein the scalable video coding format is H.264 SVC and wherein the information not required to decode the output video signal at the intended resolution comprises inter blocks where residual prediction is not used, wherein the replacing comprises setting coefficients of each of the inter blocks to zero and accordingly modifying a coded block pattern of each of the inter blocks;

and wherein encoding of neighboring blocks is modified if the information replacement affects the encoding of the neighboring blocks.

8. The method of claim 3, wherein the information not required to decode the output video signal at the intended resolution comprises intra blocks where mode prediction is not used and either each of the intra blocks is not used for intra prediction by neighboring blocks or none of the neighboring blocks are used for predicting the target layer, wherein the removing comprises inferring coefficients of each of the intra blocks to be zero for further prediction inside a layer corresponding to each of the intra blocks;

and wherein encoding of neighboring blocks is modified if the information replacement affects the encoding of the neighboring blocks.

9. The method of claim 3, wherein the information not required to decode the output video signal at the intended resolution comprises inter blocks where no mode prediction or motion prediction are used, wherein the removing comprises removing motion information from each of the inter blocks and inferring motion vector differences to be 0 for further prediction inside a layer corresponding to each of the inter blocks;

and wherein encoding of neighboring blocks is modified if the information replacement affects the encoding of the neighboring blocks.

10. The method of claim 3, wherein the information not required to decode the output video signal at the intended resolution comprises inter blocks where residual prediction is not used, wherein the removing comprises removing all syntax elements relating to residual coding and inferring the syntax elements to be 0 for prediction inside a layer corresponding to each of the inter blocks;

and wherein encoding of neighboring blocks is modified if the information replacement affects the encoding of the neighboring blocks.

11. A non-transitory computer readable medium comprising a set of instructions to direct a processor to:

process an input digital video signal, encoded in a scalable video coding format that supports one or more of spatial and quality scalability in order to produce an output digital video signal at an intended resolution, by:

for the output signal, replacing information in a plurality of scalable layers of at least one input video signal lower than a target layer that corresponds to the intended resolution such that information not required to decode the output video signal at the intended resolution is replaced by information that requires fewer bits in the output video signal, and wherein the output video signal with the replaced information is still conforming to the scalable video coding format, wherein a side information input data enables the replacement of the information not required to decode the output video signal at the intended resolution of the side information input data without fully parsing the entire input video signal.

12. The non-transitory computer readable medium of claim 11, wherein the scalable video coding format is H.264 SVC; wherein the information not required to decode the output video signal at the intended resolution comprises macroblocks that are not used for predicting the target layer; wherein the replacing comprises signaling each of the macroblocks are skipped; and wherein encoding of neighboring blocks is modified if the information replacement affects the encoding of the neighboring blocks.

13. The non-transitory computer readable medium of claim 11, wherein the scalable video coding format is H.264 SVC; wherein the information not required to decode the output video signal at the intended resolution comprises intra blocks where mode prediction is not used and either each of the intra blocks is not used for intra prediction by neighboring blocks, or none of the neighboring blocks are used for predicting the target layer;

wherein the replacing comprises setting coefficients of each of the intra blocks to zero and accordingly modifying a coded block pattern of each of the intra blocks; and wherein encoding of neighboring blocks is modified if the information replacement affects the encoding of the neighboring blocks.

14. The non-transitory computer readable medium of claim 11, wherein the scalable video coding format is H.264 SVC;

wherein the information not required to decode the output video signal at the intended resolution comprises inter blocks where no mode prediction or no motion prediction are used;

wherein the replacing comprises setting motion information of each of the inter blocks to zero; and wherein encoding of neighboring blocks is modified if the information replacement affects the encoding of the neighboring blocks.

15. The non-transitory computer readable medium of claim 11, wherein the scalable video coding format is H.264 SVC;

wherein the information not required to decode the output video signal at the intended resolution comprises inter blocks where residual prediction is not used;

wherein the replacing comprises setting coefficients of each of the inter blocks to zero and accordingly modifying a coded block pattern of each of the inter blocks; and wherein encoding of neighboring blocks is modified if the information replacement affects the encoding of the neighboring blocks.

16. A non-transitory computer readable medium comprising a set of instructions to direct a processor to:

process an input digital video signal, encoded in a scalable video coding format that supports one or more of spatial and quality scalability in order to produce an output digital video signal at an intended resolution, by:

for the output signal, removing information in a plurality of scalable layers of at least one input video signal lower than a target layer that corresponds to the intended resolution such that information not required to decode the output video signal at the intended resolution is removed in the output video signal, wherein a side information input data enables the elimination of the information not required to decode the output video signal at the intended resolution of the side information input data without fully parsing the entire input video signal.

17. The non-transitory computer readable medium of claim 16, wherein the information not required to decode the output video signal at the intended resolution comprises macroblocks that are not used for predicting the target layer;

wherein the removing comprises removing each of the macroblocks; and wherein encoding of neighboring blocks is modified if the information replacement affects the encoding of the neighboring blocks.

18. The non-transitory computer readable medium of claim 16, wherein the information not required to decode the output video signal at the intended resolution comprises intra blocks where mode prediction is not used and either each of the intra blocks is not used for intra prediction by neighboring blocks or none of the neighboring blocks are used for predicting the target layer;

wherein the removing comprises inferring coefficients of each of the intra blocks to be zero for further prediction inside a layer corresponding to each of the intra blocks; and wherein encoding of neighboring blocks is modified if the information replacement affects the encoding of the neighboring blocks.

19. The non-transitory computer readable medium of claim 16, wherein the information not required to decode the output video signal at the intended resolution comprises inter blocks where no mode prediction or motion prediction are used;

wherein the removing comprises removing motion information from each of the inter blocks and inferring motion vector differences to be 0 for further prediction inside a layer corresponding to each of the inter blocks; and wherein encoding of neighboring blocks is modified if the information replacement affects the encoding of the neighboring blocks.

20. The non-transitory computer readable medium of claim 16, wherein the information not required to decode the output video signal at the intended resolution comprises inter blocks where residual prediction is not used;

wherein the removing comprises removing all syntax elements relating to residual coding and inferring the syntax elements to be 0 for prediction inside a layer corresponding to each of the inter blocks; and wherein encoding of neighboring blocks is modified if the information replacement affects the encoding of the neighboring blocks.

* * * * *